Dec. 3, 1929.    O. L. BARNEBEY    1,737,822
APPARATUS FOR THE RECOVERY OF GASES AND VAPORS
Filed July 2, 1924    3 Sheets-Sheet 1

Inventor
Oscar L. Barnebey
By Ray S. Irehr
Attorney

Inventor
Oscar L. Barnebey
By Roy S. [signature]
Attorney

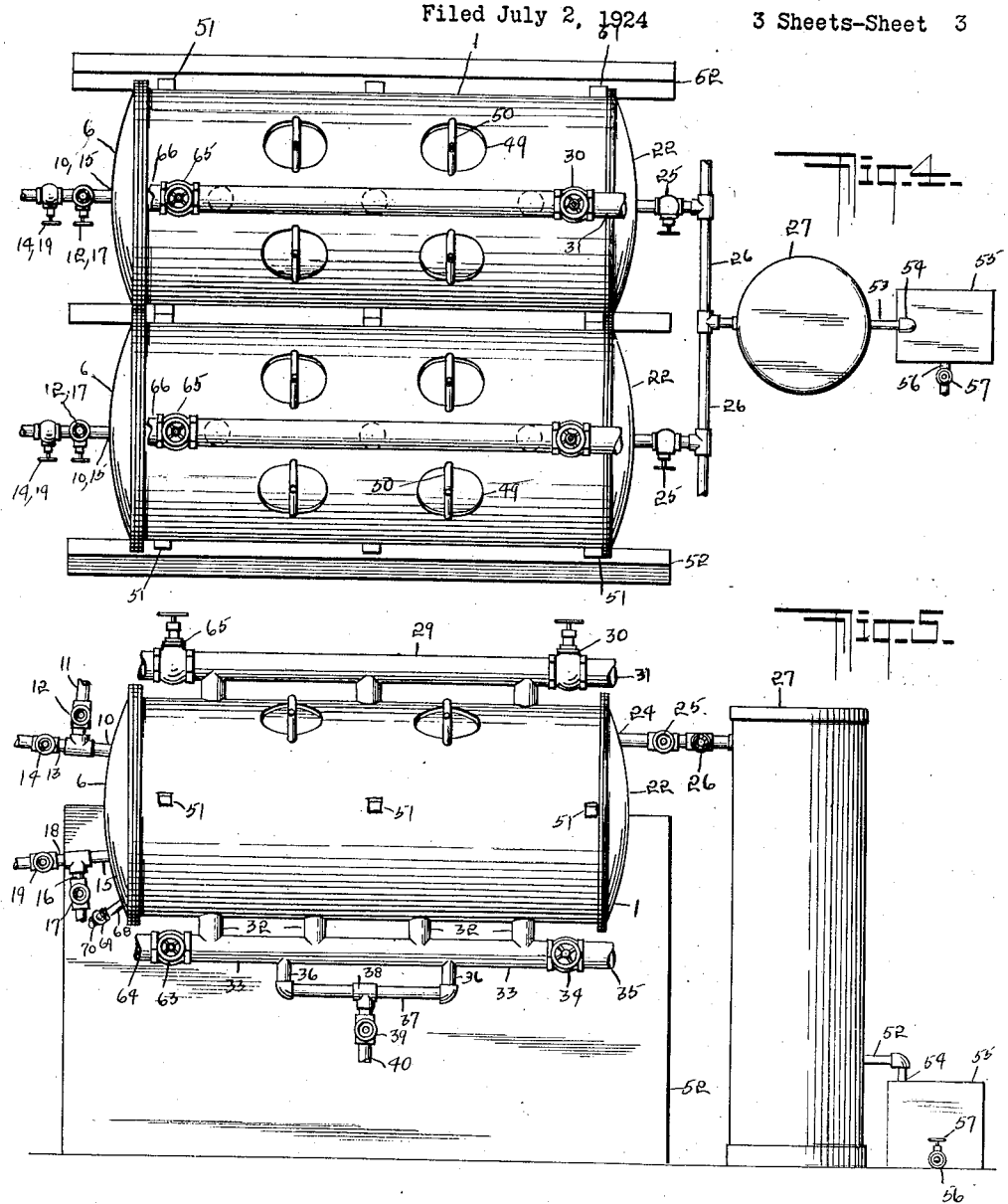

Patented Dec. 3, 1929

1,737,822

UNITED STATES PATENT OFFICE

OSCAR L. BARNEBEY, OF COLUMBUS, OHIO, ASSIGNOR TO AMERICAN SOLVENT RECOVERY CORPORATION, A CORPORATION OF OHIO

APPARATUS FOR THE RECOVERY OF GASES AND VAPORS

Application filed July 2, 1924. Serial No. 723,642.

My invention relates to improvements in apparatus for recovery with adsorbent carbon of adsorbable gases and vapors from air or other unadsorbable diluent gases.

One of the objects of the present invention is to provide an equipment which can be readily and economically constructed. Another object is to produce equipment which is sturdy in nature and which will give long service. Still another object is to produce equipment which is readily assembled and which is readily accessible for repairing when such becomes necessary. Another object is to provide equipment which will make possible rapid removal of gases and vapors by the adsorbent carbon from air or other diluent gas and also to make possible the removal of the gases and vapors from the adsorbent carbon after they have been taken up by the same. Still another object attained is to provide equipment which is easy to operate after being installed. A further object is to obtain a high yield of adsorbable gases and vapors.

In my invention I place the adsorbent carbon in a uniform horizontal layer in each adsorber. The adsorber may be considered to have three zones, one zone being a distributing chamber, one zone being adsorbent carbon and another zone being a collecting chamber. The adsorbent carbon in the middle zone surrounds a large number of heating and cooling pipes which are arranged in a special manner to give a rapid heating of the carbon during distillation and to allow rapid cooling of the carbon during the adsorption period. During the heating period steam is passed through the coils and during the cooling period cooling water is circulated through the same coils. Good distribution of water and steam to and through the coil system is made possible by a specially designed distributor. Means of introducing steam and water are provided in the distributor all of such means being removable when desired. Also means for removing the condensed water and the warm cooling water are provided in the distributor. These means are likewise removable when desired. Further, the distributor itself is removable in two sections and with the inner section of the distributor the entire tube system can be taken from the carbon zone of the adsorber.

The end opposite to the distributor end is also removable to allow access to the interior of the adsorber. Manholes are provided for convenience of ready access to interior of the adsorbers. Intakes for gases containing the gases or vapors to be recovered and exits for gases freed from the adsorbable gases and vapors are provided. Intake and exit for cooling air or other cooling gases are provided as well as steam and water connections as above stated.

Valves for controlling the flow of gases entering and exiting from the adsorbers, valves to control the flow of cooling gases to and from the adsorbers as well as valves for the controlling of steam, condensed water, cooling water, etc., are provided to give complete control of the condition of adsorbers and operation of the same at all times. The system also includes a condenser and holding tank for receiving the liquefied solvents and vapors.

Referring to Figs. 1 to 5 inclusive, which illustrate one form of my invention, I shall now describe said invention in detail.

Fig. 4 is a plan view on a reduced scale of the entire apparatus.

Fig. 5 is a side elevation on a similar scale of the entire apparatus, with one of the supporting walls 52 omitted to more clearly disclose some of the structural features.

Figure 1:
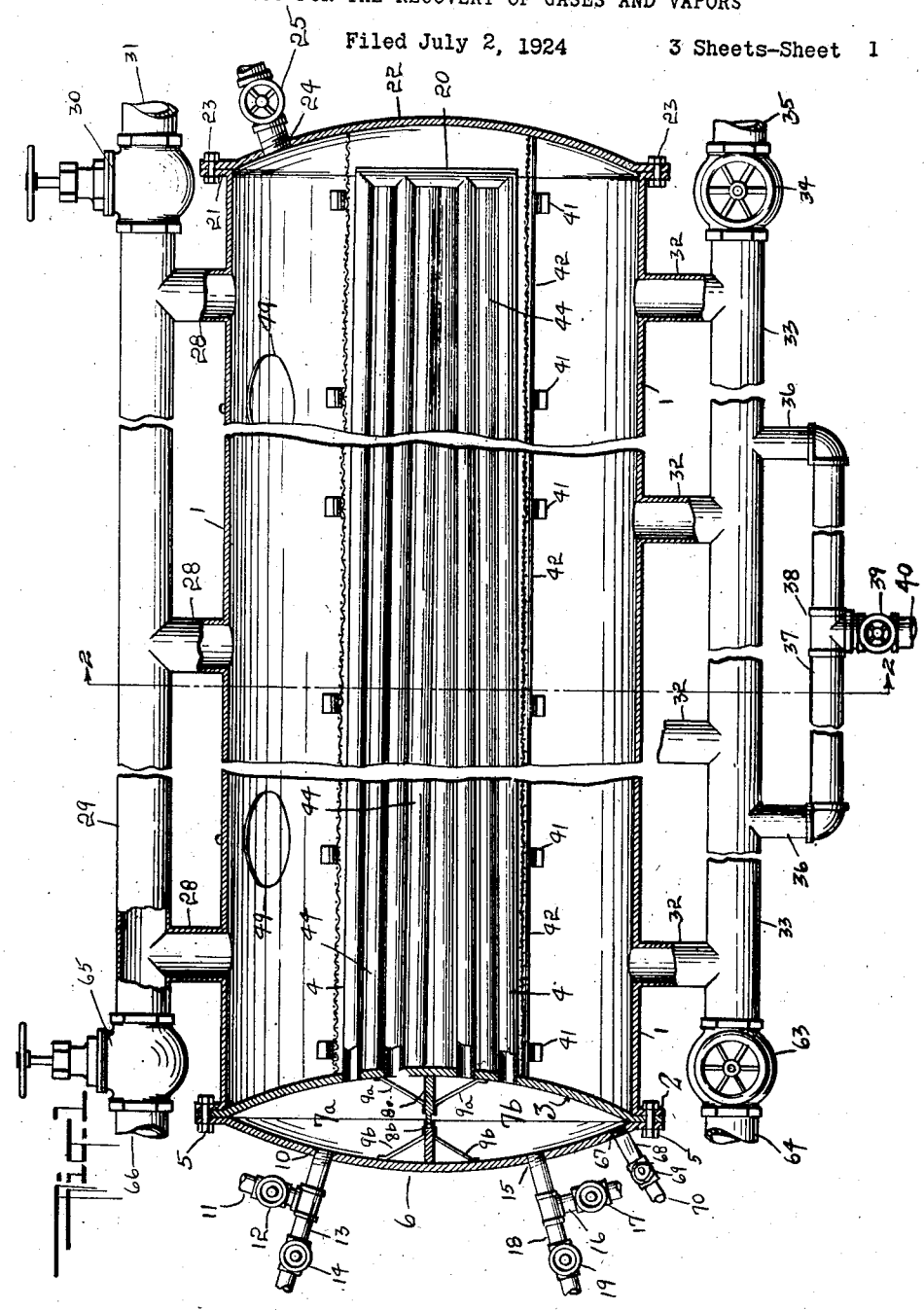
Fig. 1 is a vertical longitudinal section through one of my improved adsorbers, the adsorbent material being omitted for clearness of illustration of other parts.
Figure 2:
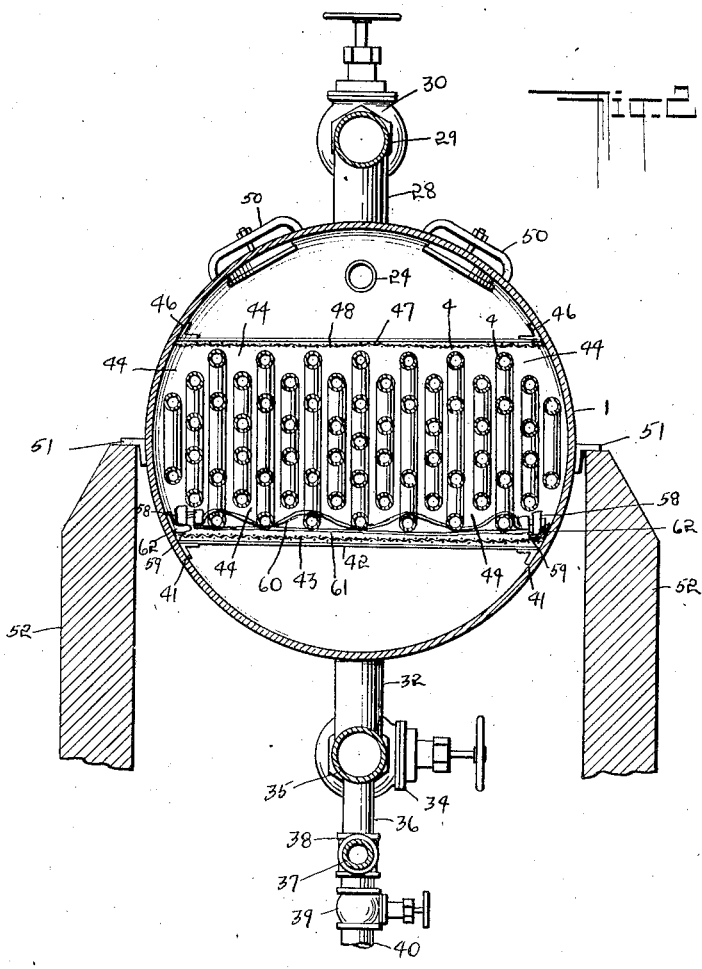
Fig. 2 is a section on the line 2—2 of Fig. 1.

In the apparatus illustrated, 1 is the cylindrical horizontally disposed shell of the adsorber. At one end this shell has a flange 2 riveted, bolted or welded thereon. An inwardly dished tube plate 3 carrying the tubes 4 is secured to flange 2 by bolts 5, thus fastening the tube plate rigidly to the adsorber shell. An outwardly dished header plate 6 is also securely fastened and held in position by the bolts 5 as indicated. This construction provides for the distributing chamber which is divided into compartments 7$^a$ and 7$^b$ by plates 8$^a$ and 8$^b$. The edge of plate 8$^a$ fits snugly into a groove in plate 8$^b$, making a steam and water tight joint with freedom of expansion and contraction and so avoiding breakage when the parts are suddenly heated or cooled. Stays 9$^a$ and 9$^b$ hold plates 8$^a$ and 8$^b$ securely in position.

10 is intake for steam during generating period and exit for warm water during adsorption period. Into 10 is connected steam intake connection 11 with valve 12 and water exit connection 13 with valve 14. 15 is exit for condensed steam during generating period and intake for cold water during adsorption period. Into 15 is connected hot water exit 16 with valve 17 and cold water intake 18 with valve 19. Into header 6 at 67 is attached pipe 68 possessing valve 68 and exit 69 for removing condensed water to a steam trap from which the condensate is returned to boilers.

The tubes 4 are joined together at opposite ends by manifolds 20 or in the form of U bends in pairs. By this arrangement of tubes distributing head 7$^a$ is connected to distributing head 7$^b$ through the pipes 4.

The shell 1 has another flange 21 which is also riveted, welded or bolted to the shell. This flange is fastened to the head of the adsorber as indicated.

To flange 21 is securely fastened head 22 by means of bolts 23. Exit 24 with control valve 25 is for distilled solvent which goes through manifold 26 to condenser 27. Into the top of the adsorber shell 1 is welded or riveted several pipe connections 28 to manifold 29 to which is attached control valve 30 and prolonged connection 31.

Into the bottom of the adsorber shell 1 is fastened pipe connections 32 which in turn are attached to manifold 33 carrying control valve 34 and prolonged connection 35. Also manifold 33 is connected to pipes 36 of manifold 37 with T 38, control valve 39 and connection 40.

Figure 3:
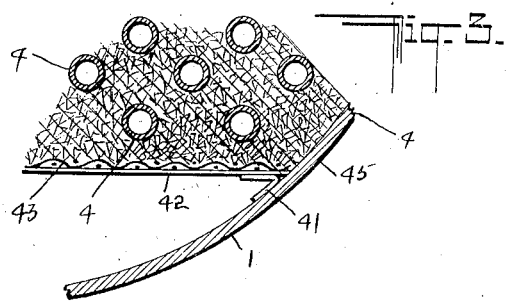
Fig. 3 is an enlarged fragmentary transverse section through a portion of the adsorbent carbon bed and imbedded tubes of the adsorber.

Lugs 41 are fastened to interior of adsorber shell and serve to support the grid-like platform 42 which is of heavy construction and has considerable open space. A single or double screen 43 is placed above the platform 42. The lower part of screen 43 when used as a double screen is of heavy non-corrodible metal and the upper screen is of fine enough mesh to properly support the granular adsorbent carbon which is used. The entire space 44 surrounding the tubes 4 is filled with granular adsorbent carbon 45 shown in detail in Figure 3.

In some cases another set of lugs 46 is used to rigidly hold down in place crossbars 47 and screen 48. Manholes 49 are provided as entrance ports of shell 1. Such manholes are closed by manhole stops 50 of regular conventional boiler construction type.

Lug supports 51 are riveted to the adsorber shell for supporting the adsorber and contents in position used in conjunction with pillar supports 52. To the condenser 27 is attached exit 53 which in turn is connected at 54 to collector or receiver 55 which has exit 56 containing valve 57 for withdrawal of solvent which has been recovered.

Roller bearings 58 attached to castings 59 which in turn are held in position by heavy strap irons 60 and 61 and tubes 4, are used to support the end of the tubes 4 at the opposite end from tube sheet 3. The rollers move on angles 62 which are firmly fastened to adsorber shell 1.

I shall now describe the assembly and operation of my invention.

With the adsorbers, condenser and receiver in position with each adsorber the platform 42 is placed on the lugs 41 followed by the double screen 43 which is securely fastened into place. The tubes 4 and tube sheet 3 are now rolled into place over angles 62. Head 6 with its connection is then positioned and flange 2, tube sheet 3, and head 6 are securely fastened together with bolts 5. Head 22 with its connection is then positioned and bolted to flange 21 with bolts 23.

Adsorbent charcoal is then added through manholes 49 and after raking to uniform depth screen 48 and crossbars 47 are inserted after which manhole heads 50 are securely closed. The equipment is now ready for use.

31 is connected to the source of air or other gas containing the solvent or vapors to be recovered or removed. 35 is connected to vent or other disposal of air or gas after solvent has been removed. 40 is connected to steam line. 25 is connected to condenser. 64 is connected to cooling air supply. 66 is connected to waste or to another adsorber. 11 is connected to steam line. 14 is connected to hot water drain. 17 is connected to condensate drain back to the steam boilers used for steam supply. 19 is connected to cold water source.

One of the adsorbers is first saturated with solvent or vapor by passing in the air-solvent mixture or vapor-gas mixture through 31 with valves 30 and 34 opened. The gas passes through the manifold 29 and connections 28 from which the gas-vapor mixture distributes in its zone above the adsorbent carbon and then passes uniformly through the carbon bed. The carbon takes up the solvent or vapor and the diluent gas passes through the carbon and into the collection zone below and from thence out of pipes 32 through manifold 33 and open valve 34 to exit connection 35. While this is going on valves 17, 12, and 39 are closed and valves 19 and 14 are opened allowing cold water to pass through 7^b through the pipes 4 around the headers 20 and more pipes 4 to 7^a and the warmed water passes from thence out through valve 14. This cooling action removes the heat of adsorption produced when the vapors are taken up by the adsorbent carbon and by cooling the adsorbent carbon the capacity of the carbon to take up vapors is much increased. When the carbon in the first adsorber has become saturated with vapor the gas intake and exit of the first adsorber is turned off and opened into another adsorber which now takes up the solvent. While the second adsorber is taking up solvent the first adsorber is being distilled. Distillation is accomplished by turning off the cooling water circulation and opening drain valve 17 to remove water from the tubes. Meantime steam is turned on through valve 12. When the water is forced from the coils valve 17 is closed and the condensate valve 69 is opened to allow steam condensate to return to the boilers without wasting hot water. Full steam boiler pressure is ordinarily used to heat the coils. The higher the boiler pressure available in the plant using the system the more rapid is the transfer of heat to the adsorbent carbon and adsorbed vapors. In this relation it is much to be desired to have a boiler pressure from 80 to 150 pounds available for the work. Meantime valve 25 is opened to allow distillate to pass to the condenser.

Valve 39 is opened to give entrance of steam to the adsorbent carbon to hasten distillation, the same boiler pressures being used for this purpose as for the indirect heating through the tubes. The excess steam and the distilled vapors are condensed in the condenser 27 and received in vessel 55 and from which the condensed liquid is tapped off at convenience through 56 and 57.

When distillation is completed valve 39 is closed and air is blown through the valve 63 to remove the excess steam and moisture which is exited through valve 65 and pipe 66 to any convenient place. Sometimes the first air blown through the adsorber removes a substantial amount of solvent in which case the same is cooled and blown into another adsorber to avoid wasting solvent. When steam is no longer emitted the valves 12 and 69 are closed and cooling water passed as before through valves 19 and 14, meantime continuing the passage of air until the adsorbent carbon has been satisfactorily cooled and also dried.

The carbon is now ready for taking up more solvent vapors or other gases to be recovered in the same manner as before. Meantime after the second tower has become saturated it is distilled, etc. By having a sufficient number of adsorbers the proper number will always be adsorbing so that the process is conducted in a continuous manner. While some of the adsorbers are adsorbing the gases or vapors other adsorbers are being distilled and cooled. In each specific case the number of adsorbers used in the plant are determined by the quantity of gases or vapors to be recovered, the concentration of the same in the air or other diluent gas, the length of time required to saturate the adsorbent carbon in each adsorber, the length of time required for distillation and the length of time required for cooling. This adjustment as to number of adsorbers is readily computed in advance and after installation is made the operation of the adsorbers as above described proceeds smoothly and in a continuous manner.

It is to be observed that air cannot with safety be brought into contact with the adsorbent carbon at greatly elevated temperatures, especially in the presence of inflammable gases and vapors. However, I have demonstrated that if the temperature of the carbon does not exceed that corresponding to the normal temperature of steam at 150° pressure, the use of air for drying and cooling the carbon as above described is entirely safe and feasible.

Referring to the description of my new recovery apparatus as heretofore described, specific attention is called to certain specific features.

The adsorbent carbon is disposed in a uniform horizontal layer supported by a heavy screen support beneath the same. This arrangement allows the passage of gas regardless of velocity down through the adsorbent carbon in a uniform manner and also allows the passage of gas in the opposite direction, namely upward through the adsorbent carbon bed so long as the velocity does not attain the critical velocity at which the carbon will be lifted by reason of the rapidly moving gas. In such cases as the latter the secondary screen heretofore described is placed above the carbon bed in such a manner as to hold the carbon rigidly in place regardless of the velocity of the gas passing through the carbon bed.

A very large number of heating and cooling coils are used within the carbon bed. The pipes or tubes constituting these coils are arranged in such a manner as to be approximately equi-distant from each other to secure the best effect in the transfer of heat to all parts of the carbon bed. The relation of the heating surface of the pipe coil system to the amount of space filled with carbon is very important. Ordinarily the cross sectional space taken up by the cooling and heating coil system should not be less than ten per cent nor more than fifty per cent of the entire carbon bed area occupying the space between the two screens as illustrated and of this percentage the range of fifteen to thirty per cent is much to be preferred for the space occupied by the heating and cooling pipes in this area. The balance of the space naturally is filled with adsorbent carbon.

The special arrangement of the header or distributing chamber in relation to the positioning of the cooling and heating coils is very advantageous since it causes excellent flow of steam and gives good heating during the heating period and likewise gives excellent control of passage of water with efficient using of the same during the cooling period. The connecting means into this distributing header whereby steam and cold water can be introduced and controlled and whereby condensed water can be returned under control to the boilers through agency of a steam trap and likewise the means by which warmed cooling water can be exited from this distributor are of great value in operation of the adsorber.

The distribution of gas intake and exit from the adsorbers into several points of entrance and exit insures uniform introduction of gases into the distributing zone and uniform removal of gases from the collecting zone of the adsorbers.

The removable heads and tube plates of the adsorbers and likewise the removable feature of the entire heating and cooling coil system is of great convenience and value both from point of view of original assembly and for making repairs as such become necessary. The bolted construction for these headers is of particular value in this respect. Gaskets are used to give the bolted construction an absolutely tight fit although the gaskets are not shown in the drawings.

The combination of a series of the adsorbers by proper ratioing the number of adsorbers required for taking up the gases or vapors to those required for distilling and for cooling to give continuous operation is an added feature. Means for introducing air for auxillary cooling of the carbon and for removing residual steam is of importance likewise as this cooling effect greatly reduces the time necessary for cooling the adsorbent carbon. The means of introducing steam into the lower manifold for distribution into the adsorber is likewise of value. Under some conditions of use distillation can be satisfactorily carried out entirely by the admission of steam into direct contact with the carbon, and accordingly it is obvious that where the use of the apparatus is to be limited to such conditions the embedded heating and cooling tubes can be omitted, especially as cooling as well as drying of the carbon can be effected by passing air through it as previously described. A condensate trap beneath the intake 40 is used to remove any condensed water as it runs back from the manifolds of the piping system. The manner in which the adsorbers are supported is of great convenience in the assembly and also for operation of the adsorbers.

Many other advantageous features provided in the invention will be obvious to those operating the equipment.

It may be observed that the apparatus herein disclosed is adapted for use in carrying out the process which constitutes the subject of my copending application Serial No. 723,643, filed of even date herewith.

It will be understood that while I have set forth in detail a preferred form of construction, the latter can in many respects be varied without departing from the invention as defined in the following claims.

I claim:

1. In apparatus of the class described, the combination of an elongated, substantially cylindrical shell having its longitudinal axis substantially horizontally disposed, closures for the ends thereof, a horizontal bed of adsorbent carbon supported in the central part of the shell and extending substantially from end to end thereof thus dividing the interior of the shell into top and bottom zones for gases and vapors and an intermediate zone occupied by the carbon, inlet and exit ports for conducting gases into and out of the top and bottom zones, and heat interchange means embedded in the carbon.

2. In apparatus of the character set forth, the combination of an elongated substantially cylindrical shell having its longitudinal axis substantially horizontally disposed, heads closing the ends of said shell, a horizontal layer of adsorbent carbon disposed in the central part of the shell and extending from end to end thereof, an aperture for gases through the shell above the layer of carbon, an aperture for gases through the shell below the layer of carbon, heat interchange tubes embedded in the layer of carbon and having their inlets and outlets extending through one head of the shell.

3. In apparatus of the character set forth, the combination of an elongated substantially cylindrical shell having its longitudinal axis substantially horizontally disposed, a horizontal layer of adsorbent carbon disposed in the central part of the shell and extending substantially from end to end and side to side thereof, an aperture for gases through the shell above the layer of carbon, an aperture for gases through the shell below the layer of carbon, and an inlet into the shell for the admission of steam into direct contact with the adsorbent carbon.

4. In apparatus of the character set forth, the combination of an elongated substantially cylindrical shell, having its longitudinal axis substantially horizontally disposed, a head closing one end of said shell, a chambered head closing the other end of the shell and divided by a partition structure into a plurality of chambers, a horizontal layer of adsorbent carbon supported in the middle part of the shell and extending substantially from end to end thereof, heat interchange tubes embedded in the layer of carbon and having their inlets opening into one of the said chambers and their outlets into the other chamber, inlet and exit passages to and from said chambers, an aperture for gases through the shell above the layer of carbon, and an aperture for gases through the shell below the layer of carbon.

5. In an apparatus of the character set forth, the combination of an elongated substantially cylindrical shell; head structures closing the two ends of said shell; a layer of solid adsorbent material occupying a central zone extending substantially from side to side and from end to end of the shell with a distributing zone at one side and a collecting zone at the other side thereof; foraminous partition means for supporting the said adsorbent material; an inlet conduit for gases communicating with the said distributing zone; and an outlet conduit for unadsorbed gases communicating with the said collecting zone.

6. In an apparatus of the character set forth, the combination of an elongated substantially cylindrical shell; head structures closing the two ends of said shell; a layer of solid adsorbent material occupying a central zone extending substantially from side to side and from end to end of the shell with a distributing zone at one side and a collecting zone at the other side thereof; foraminous partition means for supporting the said adsorbent material; heat interchange tubes embedded in the layer of carbon and having both their inlet ends and their outlet ends extending through the same head of the shell; a header chamber with which the inlet ends of said tubes communicate; a header chamber with which the outlet ends of said tubes communicate; an inlet conduit for gases communicating with the said distributing zone; and an outlet conduit for unadsorbed gases communicating with the said collecting zone.

7. In an apparatus of the character set forth, the combination of an elongated substantially cylindrical shell; head structures closing the two ends of said shell; a layer of solid adsorbent material occupying a central zone extending substantially from side to side and from end to end of the shell with a distributing zone at one side and a collecting zone at the other side thereof; foraminous partition means for supporting the said adsorbent material; an inlet conduit for gases communicating with the said distributing zone; an outlet conduit for unadsorbed gases communicating with the said collecting zone; an inlet conduit for steam opening into the zone at one side of the carbon; and an outlet conduit for distillate leading from the zone at the other side of the carbon.

8. In an apparatus of the character set forth, the combination of an elongated substantially cylindrical shell; head structures closing the two ends of said shell; a layer of solid adsorbent material occupying a central zone extending substantially from side to side and from end to end of the shell with a distributing zone at one side and a collecting zone at the other side thereof; foraminous partition means for supporting the said adsorbent material; heat interchange tubes embedded in the layer of carbon and having both their inlet ends and their outlet ends extending through the same head of the shell; a header chamber with which the inlet ends of said tubes communicate; a header chamber with which the outlet ends of said tubes communicate; an inlet conduit for gases communicating with the said distributing zone; an inlet conduit for steam opening into the zone at one side of the carbon; and an outlet conduit for distillate leading from the zone at the other side of the carbon.

9. In an apparatus of the character set forth, the combination of an elongated substantially cylindrical shell; head structures closing the two ends of said shell; a layer of solid adsorbent material occupying a central zone extending substantially from side to side and from end to end of the shell with a distributing zone at one side and a collecting zone at the other side thereof; foraminous partition means for supporting the said adsorbent material; heat interchange tubes embedded in the layer of carbon and having both their inlet ends and their outlet ends extending through the same head of the shell; a header chamber with which the inlet ends of said tubes communicate; a header chamber with which the outlet ends of said tubes communicate; an inlet conduit for gases communicating with the said distributing zone; an outlet conduit for unadsorbed gases communicating with the said collecting zone; an inlet for admission of air to one of said zones; and an outlet for discharge of air.

10. In an apparatus of the character set forth, the combination of an elongated substantially cylindrical shell; head structures closing the two ends of said shell; a layer of solid adsorbent material occupying a central zone extending substantially from side to side and from end to end of the shell with a distributing zone at one side and a collecting zone at the other side thereof; foraminous partition means for supporting the said adsorbent material; heat interchange tubes embedded in the layer of carbon and having both their inlet ends and their outlet ends extending through the same head of the shell; a header chamber with which the inlet ends of said tubes communicate; a header chamber with which the outlet ends of said tubes communicate; an inlet conduit for gases communicating with the said distributing zone; an outlet conduit for unadsorbed gases communicating with the said collecting zone; and an outlet for condensate from one of the header chambers.

11. In an apparatus of the character set forth, the combination of an elongated substantially cylindrical shell; head structures closing the two ends of said shell, one of said head structures comprising an inwardly dished tube plate and an outwardly dished plate inclosing a space between them, and a partition dividing said space into an inlet header chamber and an outlet header chamber; a layer of solid adsorbent material occupying a central zone extending substantially from side to side and from end to end of the shell with a distributing zone at one side and a collecting zone at the other side thereof; heat interchange tubes embedded in the layer of adsorbent material with both their inlet ends and their outlet ends secured in the said tube plate and communicating respectively with said inlet and outlet header chambers; an inlet conduit for gases communicating with the said distributing zone; and an outlet conduit for unadsorbed gases communicating with the said collecting zone.

12. In an apparatus of the character set forth, the combination of an elongated substantially cylindrical shell; head structures closing the two ends of said shell; a layer of solid adsorbent material occupying a central zone extending substantially from side to side and from end to end of the shell with a distributing zone at one side and a collecting zone at the other side thereof; foraminous partition means for supporting the said adsorbent material; heat interchange tubes embedded in the layer of adsorbent material and having both their inlet ends and their outlet ends extending through the same head of the shell; a header chamber with which the inlet ends of said tubes communicate; a header chamber with which the outlet ends of said tubes communicate; inlet and outlet conduits for fluids communicating with said header chambers; an inlet conduit for gases communicating with the said distributing zone; and an outlet conduit for unadsorbed gases communicating with the said collecting zone.

13. In an adsorber unit, the combination of the following separable parts: a substantially cylindrical shell having foraminous partition means for supporting a layer of solid adsorbent in a chordal zone within said shell; a tube plate secured to one end of the shell and having heat interchange tubes secured at both their inlet and outlet ends in said plate and disposed in said chordal zone; and a header structure secured to the tube plate and formed with header chambers communicating respectively with the inlet and outlet ends of said tubes.

14. In apparatus of the character set forth, the combination of an elongated substantially cylindrical shell having its longitudinal axis substantially horizontally disposed; a substantially horizontal layer of adsorbent carbon disposed in the central part of the shell and extending substantially from end to end and side to side thereof; an aperture for gases through the shell above the layer of carbon; an aperture for gases through the shell below the layer of carbon; an inlet into the shell for the admission of steam into direct contact with the adsorbent carbon, and means for passing air through the shell and the layer of adsorbent carbon.

15. In apparatus of the character set forth, the combination of an elongated substantially cylindrical shell having its longitudinal axis substantially horizontally disposed; a substantialy horizontal layer of adsorbent carbon in the center of the shell and extending substantially from end to end and side to side thereof; an aperture for gases through the shell above the layer of carbon; an aperture for gases through the shell below the layer of carbon; heat interchange pipes imbedded in the layer of carbon and occupying from 10% to 50% of the cross sectional area thereof; and an inlet into the shell for the admission of steam into direct contact with the adsorbent carbon.

16. In apparatus of the character set forth, the combination of an elongated substantially cylindrical shell having its longitudinal axis substantially horizontally disposed; a substantially horizontal layer of adsorbent carbon in the center of the shell and extending substantially from end to end and side to side thereof; an aperture for gases through the shell above the layer of carbon; an aperture for gases through the shell below the layer of carbon; heat interchange pipes imbedded in the layer of carbon and occupying from 10% to 50% of the cross sectional area thereof; an inlet into the shell for the admission of steam into direct contact with the adsorbent carbon; and means for passing air through the shell and the layer of adsorbent carbon.

17. In apparatus of the character set forth, the combination of an elongated substantially cylindrical shell having its longitudinal axis substantially horizontally disposed; a substantially horizontal layer of adsorbent carbon in the center of the shell and extending substantially from end to end and side to side thereof; an aperture for gases through the shell above the layer of carbon; an aperture for gases through the shell below the layer of carbon; heat interchange pipes imbedded in the layer of carbon and occupying from 15% to 30% of the cross sectional area thereof; an inlet into the shell for the admission of steam into direct contact with the adsorbent carbon; and means for passing air through the shell and the layer of adsorbent carbon.

In testimony whereof, I hereunto affix my signature.

OSCAR L. BARNEBEY.